(12) United States Patent  (10) Patent No.: US 7,921,382 B2
Montague  (45) Date of Patent: Apr. 5, 2011

(54) METHOD FOR SMOOTH ROTATION

(76) Inventor: Roland Wescott Montague, North Saanich (CA)

( * ) Notice: Subject to any disclaimer, the term of this patent is extended or adjusted under 35 U.S.C. 154(b) by 768 days.

(21) Appl. No.: 11/741,690

(22) Filed: Apr. 27, 2007

(65) Prior Publication Data

US 2008/0270925 A1   Oct. 30, 2008

(51) Int. Cl.
*G06F 3/00* (2006.01)
*G06F 3/048* (2006.01)
(52) U.S. Cl. ......... 715/848; 715/757; 715/850; 715/862
(58) Field of Classification Search .................. 715/757, 715/782, 784, 836, 848, 850, 852, 769, 862
See application file for complete search history.

(56) References Cited

U.S. PATENT DOCUMENTS

| | | | | |
|---|---|---|---|---|
| 6,128,631 | A | * | 10/2000 | Wallace et al. ............ 715/234 |
| 2002/0054164 | A1 | * | 5/2002 | Uemura .................... 345/848 |
| 2004/0100479 | A1 | * | 5/2004 | Nakano et al. ............ 345/700 |
| 2007/0146325 | A1 | * | 6/2007 | Poston et al. ............. 345/163 |

OTHER PUBLICATIONS

Apple Computer Inc, Quicktime version 7.0.4 copyright 1991-2006—as viewed at http://www.apple.com/hardware/gallery/ or find a specific example at http://www.apple.com/hardware/gallery/ipod/320.html.

* cited by examiner

*Primary Examiner* — Ba Huynh
*Assistant Examiner* — Truc T Chuong

(57) ABSTRACT

A method for smooth rotation of an object viewed from a finite number of angles encompasses resetting the drag origin in response to the pointer exiting a region centered on the drag origin. Upon exiting the region, a new view of the object displays thereby providing the appearance of rotation.

12 Claims, 4 Drawing Sheets

METHOD FOR SMOOTH ROTATION

BACKGROUND OF THE INVENTION

The present invention relates to software applications that display images of physical objects from a finite number of angles, and more particularly to a method for enhancing the smoothness of rotation.

Internet multi-media viewers, such as Quicktime by Apple Computer, provide the experience of rotating a physical object by allowing a user to control which view, of a finite number of views taken from different angles, is to be displayed. Typically, the user will activate a rotation mode then press and drag within the application.

Dragging horizontally displays a sequence of views of the object from angles where the value of the longitude coordinate varies. Dragging vertically displays a sequence of views of the object from angles where the value of the colatitude coordinate varies. Dragging in a diagonal direction varies the values of both longitude and colatitude coordinates, as one would expect.

To realize reasonable pointer sensitivity, the current view to display is typically determined by a function with inputs comprising of, the total number of horizontal pixels drug divided by a predefined number of pixels per view, such as six; and the total number of vertical pixels drug divided by the predefined number of pixels per view.

The perception of jerky rotation occurs when the user drags in a near diagonal direction such as forty degrees from horizontal. In this case, the display updates to a new view in the longitude direction after a total traveled distance of eight pixels. Shortly after, the display updates to a new view in the colatitude direction after a total traveled distance of just ten pixels. Likewise, the next longitude view change occurs at sixteen pixels and colatitude at just nineteen pixels. Thus, the user perceives jerky, zigzag, rotation by way of a pause, then two relatively quick changes of views, followed by a relatively long pause, and again two relatively quick changes of views.

There remains a need to improve the user experience by providing smoother rotation when dragging diagonally.

BRIEF SUMMARY OF THE INVENTION

Accordingly, an aspect of the present invention provides a method of displaying a new view from a different angle when a user drags a pointer out of a predefined region centered on the drag origin. The drag origin then resets to be the position of the pointer when exiting the region.

Other novel features of the present invention are apparent from the summary, detailed description, claims, and attached drawings.

BRIEF DESCRIPTION OF THE DRAWINGS

In drawings which help illustrate the present invention.

DETAILED DESCRIPTION OF THE PREFERRED EMBODIMENTS

Figure 1:
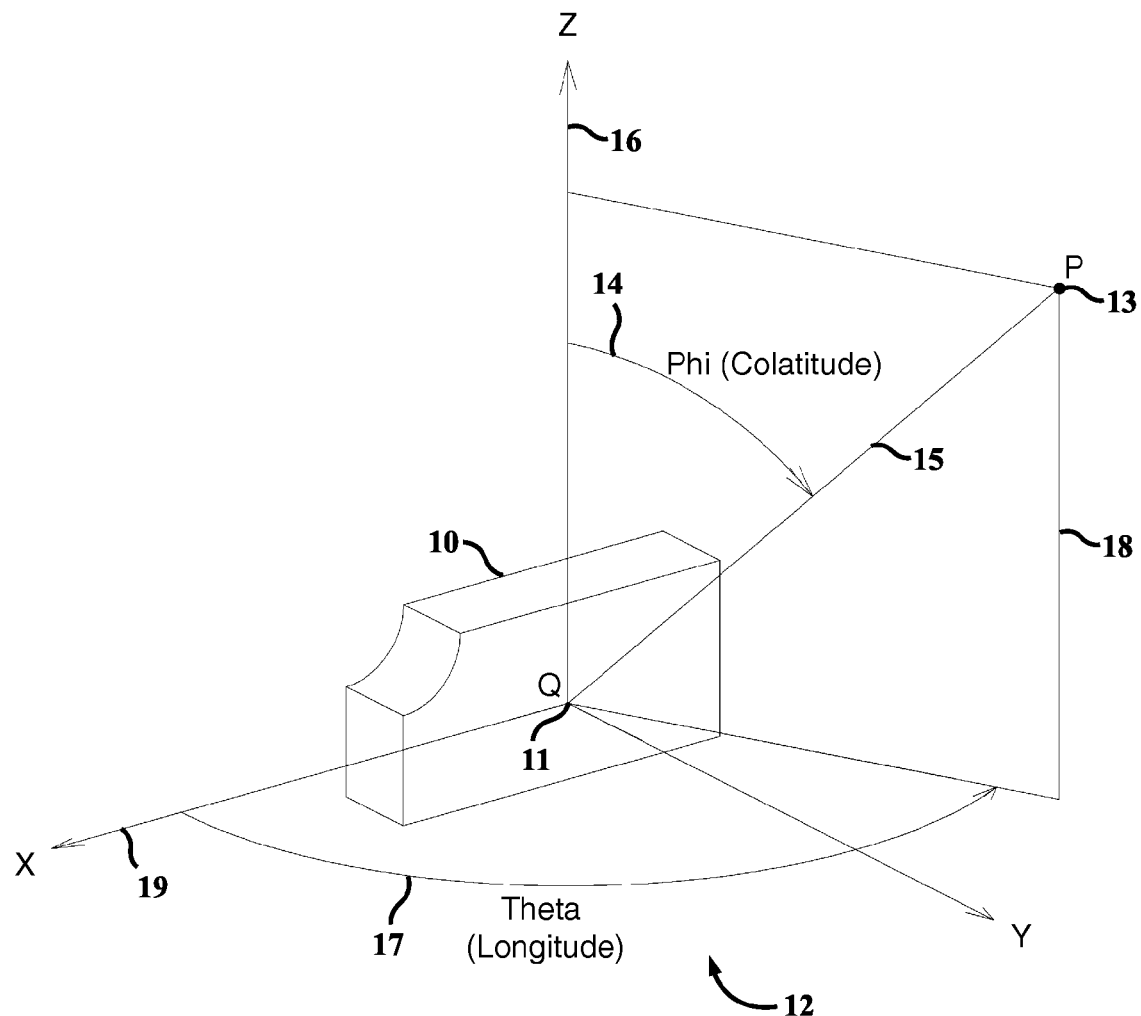
FIG. 1 is an isometric of an object in a spherical coordinate system.

FIG. 1 shows a 3-dimensional subject object 10 at a origin Q 11 of a spherical coordinate system 12 and a point P 13 from which object 10 is viewed. In the system of spherical Coordinates 12 point P 13 in 3-space is represented by an ordered triple (R, Phi, Theta) where R is the distance from P 13 to origin Q 11. An angle Phi 14 is the angle a radial line QP 15 makes with the positive direction of a z-axis 16, and an angle Theta 17 is the angle between a plane 18, containing P 13 and z-axis 16, and an xz-plane containing z-axis 16 and an x-axis 19. For further understanding, the Phi-surfaces (Phi=constant) are circular cones with z-axis 16 as axis; and the Theta-surfaces (Theta=constant) are vertical planes containing z-axis 16. Phi 14 is frequently referred to as the current value of the colatitude coordinate, and Theta 17 is the current value of the longitude coordinate.

Figure 2:
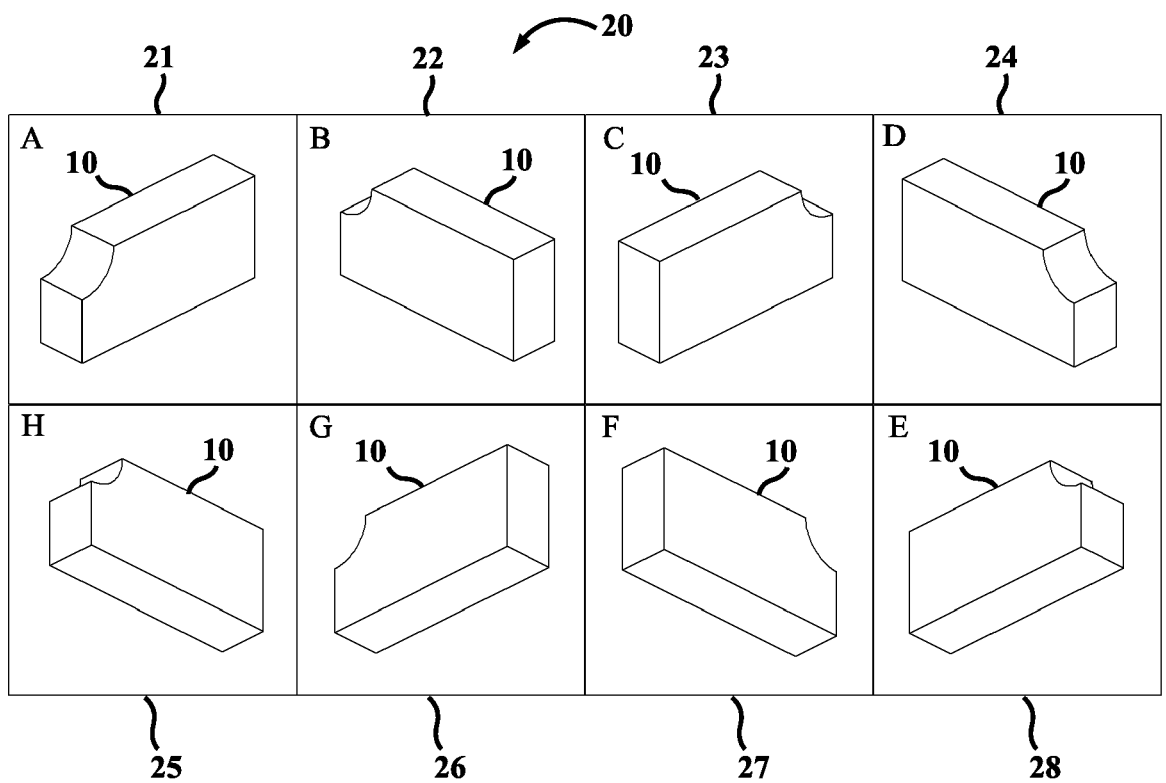
FIG. 2 is a graphical representation of a finite number views of an object stored in a data file.

FIG. 2 shows a simplified example of a graphical representation of data in a rectangular table 20 form storing 4×2 two dimensional views as seen from point P 13 to subject object 10. The top row, A to D, holds Phi 14 constant at 45 degrees and Theta 17 varies such that in view A 21 Theta=45, in view B 22 Theta=135, in view C 23 Theta=225, and in view D 24 Theta=315 degrees. Similarly, the bottom row, E to H, holds Phi 14 constant at 135 degrees and Theta 17 varies such that in view H 25 Theta=45, in view G 26 Theta=135, in view F 27 Theta=225, and in view E 28 Theta=315 degrees. The number of views for typical implementation is 16×8 and will likely increase as technology becomes faster.

When a rotate mode is active, a user may manipulate a pointer device such that a desired sequence of views 21-28 displays on a screen. Typically, the user moves the pointer within a display window, then press-and-holds a mouse button and drags the pointer in the direction of the desired rotation. Similarly, for a touch screen the user touches within the display window and maintains contact while dragging the stylus in the direction of desired rotation.

Figure 3:
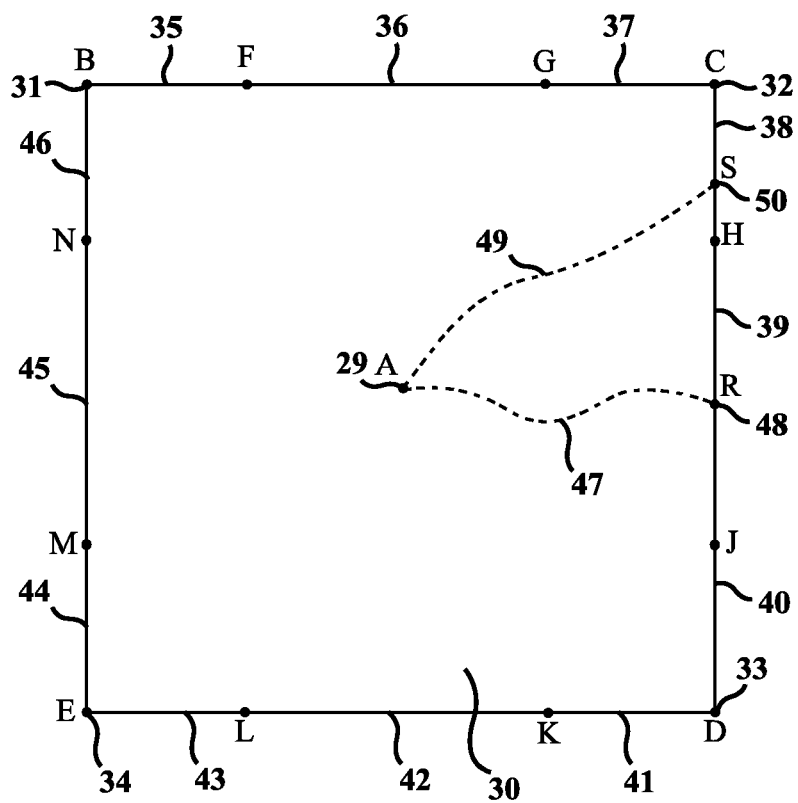
FIG. 3 shows a square region.

In a preferred embodiment, referring to FIG. 3, the user defines a drag origin point A 29 by first press-and-holding the mouse button and then dragging. A small square region 30, such as thirteen by thirteen pixels, is defined having a geometric center about drag origin point A 29, and having corners at points B 31, C 32, D 33, and E 34. Side BC having three segments, BF 35, FG 36, and GC 37. Similarly, side CD having three segments, CH 38, HJ 39, and JD 40. Side DE having three segments, DK 41, KL 42, and LE 43. Side EB having three segments, EM 44, MN 45, and NB 46.

The user dragging out of region 30 and across one of segments 35-46, results in the display of a new view of object 10 from a different pairing of Phi 14 and Theta 17 angles. An example of the user dragging horizontally along a path 47 to a point R 48 on segment HJ 39, results in displaying a new neighboring view with a smaller Theta 17 angle, such that object 10 appears to rotate to the right. Whereas, the user dragging diagonally along a path 49 to a point S 50 on segment CH 38, results in displaying a new neighboring diagonal view with a larger Phi 14 angle and a smaller Theta 17 angle, such that object 10 appears to rotate diagonally up right.

In addition to changing the view to display, the user dragging out of region 30 resets the drag origin point A 29 to be the location of exit, such as at point R 48. At this time, region 30 re-centers about the new location of the drag origin point A 29 as the user continues with the same dragging action until ultimately releasing the mouse button.

Figure 4:
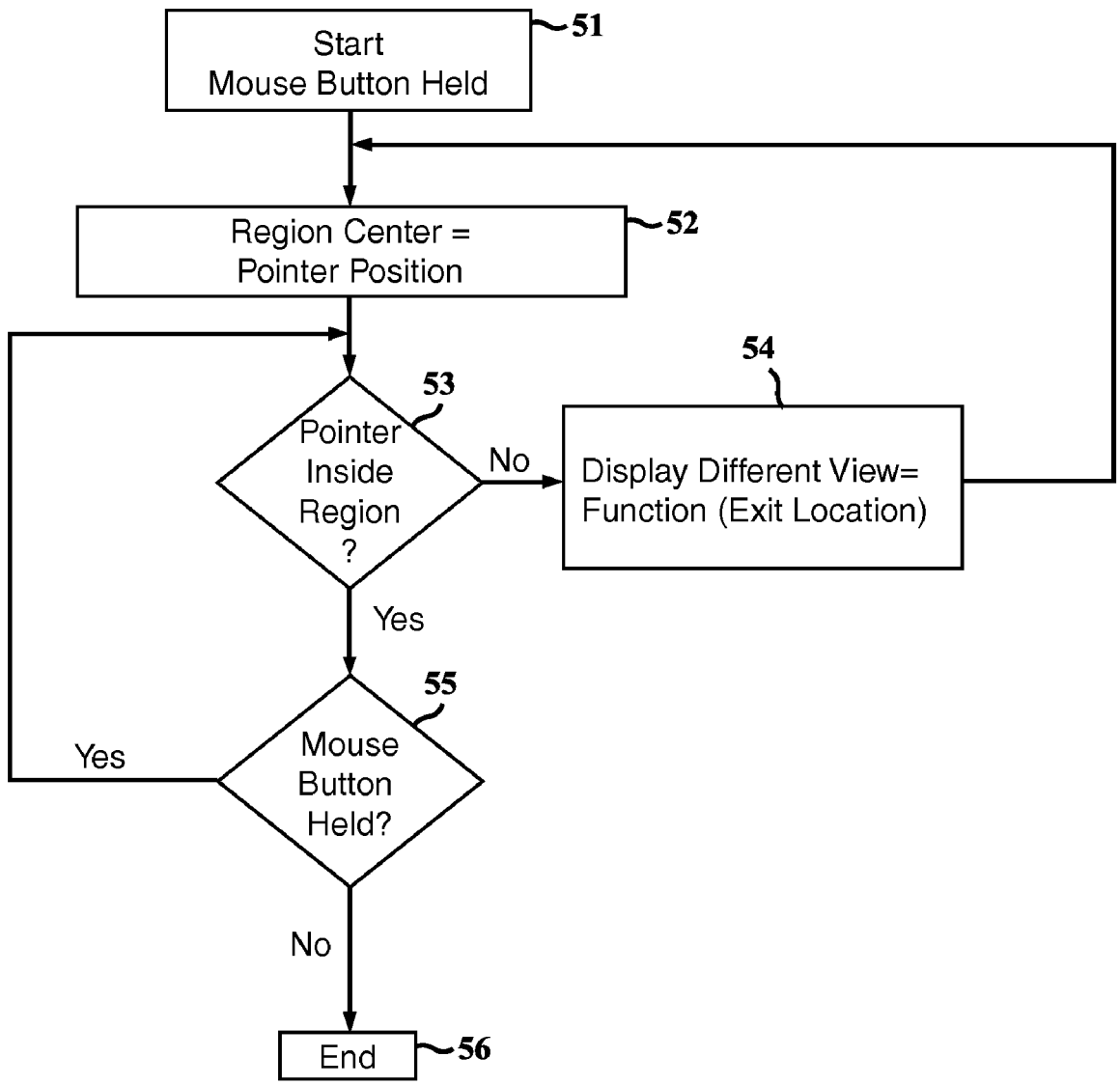
FIG. 4 is a flow chart of the present invention.

The flowchart shown in FIG. 4 describes the operation of the present invention. The rotation is started 51 upon the user activating the rotate mode by clicking an icon or selecting from a pull-down or pop-up menu, then pressing and holding the mouse button to begin a drag. In step 52, drag origin point A 29 equals the present pointer position. Region 30 geometrically centers about point A 29. In step 53, if the present pointer position is within region 30 then the flow branches to step 55, otherwise branches to step 54. Step 54, displays a different view of object 10 determined by a function having an input comprising the location of exiting region 30. Typically, the display of the new view provides the perception of object 10 rotating in one of left, right, up, down, or four diagonal directions. The flow then jumps back to step 52. In step 55, if the user continues to hold down the mouse button then the flow branches back to step 53, otherwise branches to the ending step 56.

Figure 5:
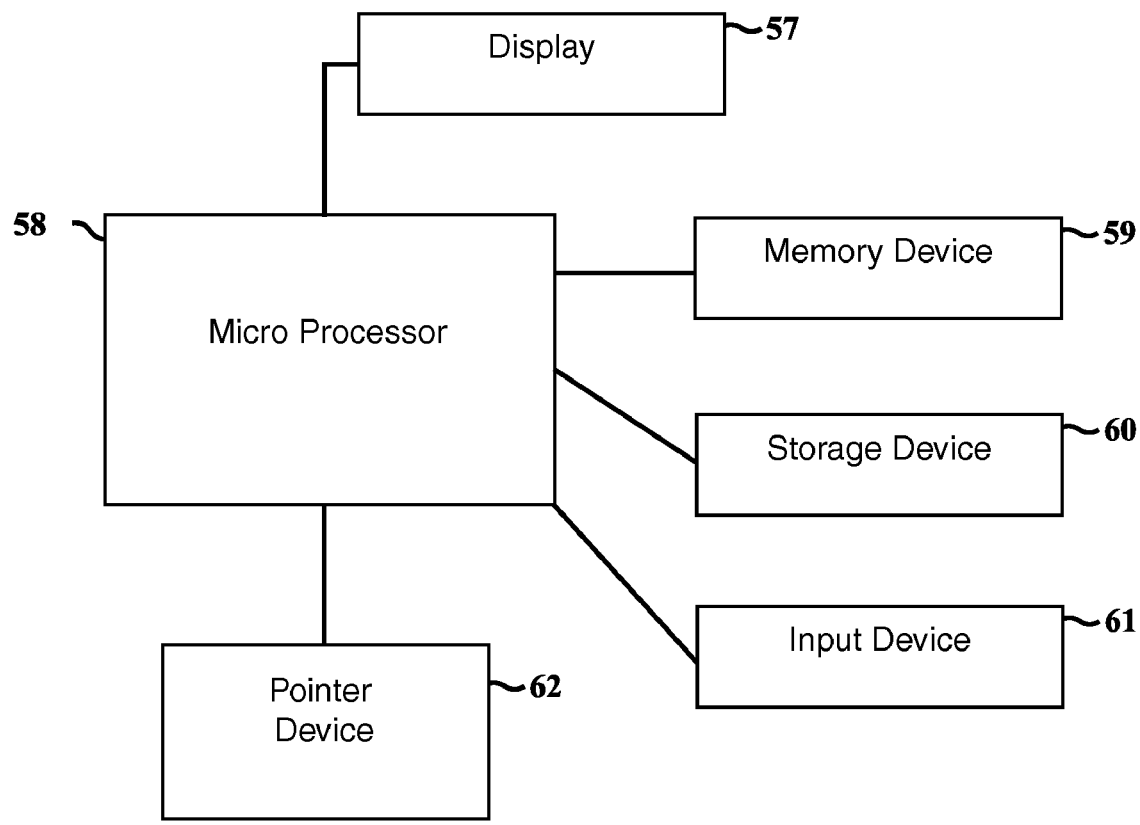
FIG. 5 is a diagram of a typical computer system.
In all figures, like reference numerals represent the same or identical components of the present invention.

Referring now to FIG. 5, a software application utilizing the present invention would typically run on an electronic device such as a computer, phone, or game console. The electronic device typically comprises a display screen 57, one or more microprocessors 58, a memory device 59, a storage device 60, an input device 61, and a pointer device 62. Microprocessor 58 communicates with memory device 59, storage device 60, input device 61, pointer device 62, and updates graphics displayed on display screen 57. Storage device 60 may be a hard-drive, internet connection, flash ram, etc. Input device 61 may be a keyboard, remote button, touch screen area with character recognition, etc. Pointer device 62 may be a mouse, touch screen, touch pad, tablet, track ball, eye tracker, accelerometer, joystick, etc. Releasing a mouse button to complete a drag is equivalent to removing a stylus from a touch screen, and similar actions involving general pointer devices 62.

The present invention's teachings may be implemented in any general purpose application such as, but not limited to, internet browsers, publication packages, presentation packages, medical image packages, or games.

It will be apparent to one skilled in the art that region 30 may be any shape, such as but not limited to, an octagon, general polygon, circle, or peanut. Re-centering region 30 may occur before displaying the new view in step 54. The apparent object rotation need not include diagonal directions.

Thus, the present invention provides a method for smoother rotation of an object viewed from a finite number of angles. Avoids zigzag and jerky rotation when the user drags diagonally by resetting the drag origin at the time a new view displays when the pointer exits a region centered on the drag origin.

Specific preferred embodiments of the present invention are described hereinabove; it is to be understood that the invention is not limited to those particular embodiments, and one skilled in the art may make various changes and modifications without departing the form the scope or the spirit of the invention as it is defined in the attached claims.

What is claimed is:

1. In an application where an object is rotated by sequencing through a finite number of predetermined views from different angles, a method of smooth rotation comprising:
   a. providing a first means for displaying a view of an object;
   b. providing a second means for performing a drag operation, the drag operation comprises a drag origin location and a present pointer location;
   c. providing a third means for defining a first region, said first region initially centered on said drag origin location, said first region having a geometric shape;
   d. providing a forth means for performing actions in response to said present pointer location exiting said first region, where said actions;
      i. redefine the location of said first region to be centered on the location of exit, and
      ii. display a different angular view of the object determined by the exit location of the pointer from said first region;
   e. Providing a fifth means for repeating d.i and d.ii for each occurrence of said present pointer location exiting said first region while the same drag operation continues without releasing.

2. The method as recited in claim 1 wherein said different view provides the appearance of rotating the object in a direction selected from the group consisting of left, right, up, and down.

3. The method as recited in claim 1 wherein said different view provides the appearance of rotating the object in a direction selected from the group consisting of left, right, up, down, diagonal up left, diagonal up right, diagonal down right, and diagonal down left.

4. The method as recited in claim 1 wherein the order of steps d(i) and d(ii) are swapped such that step d(ii) occurs before step d(i).

5. The method as recited in claim 1 wherein said first region having a geometric shape selected from the group consisting of square, octagon, polygon, and circle.

6. A computing system for visually rotating an object by sequencing through a finite number of predetermined views from different angles, the computing system comprising:
   a microprocessor;
   a first means for displaying a view of an object;
   a second means for performing a drag operation, the drag operation comprises a drag origin location and a present pointer location;
   a third means for defining a first region, said first region having a geometric shape, said first region initially centered on said drag origin location;
   a forth means for performing actions in response to said present pointer location exiting said first region, wherein said actions redefine said first region position to be centered on the location of exit and said actions display a different angular view of the object determined by the exit location of the pointer from said first region, while the same drag continues;
   whereby the object appears to rotate smoothly.

7. The computing system as recited in claim 6 wherein said different view provides the appearance of rotating the object in a direction selected from the group consisting of left, right, up, and down.

8. The computing system as recited in claim 6 wherein said different view provides the appearance of rotating the object in a direction selected from the group consisting of left, right, up, down, diagonal up left, diagonal up right, diagonal down right, and diagonal down left.

9. A computing system for visually rotating an object by sequencing through a finite number of predetermined views from different angles, the computing system comprising:
   a pointing device for a user to rotate the object by creating a drag origin location and a present pointer location;
   a display on which a view of an object displays;
   a function that performs actions in response to said present pointer location exiting a first region, said first region initially centered on said drag origin location, said first region having a geometric shape, wherein said actions display a different angular view of the object determined by the exit location of said present pointer from said first region, and said actions redefine said first region position to be centered on the location of exit;

a microprocessor that receives inputs from said pointing device, runs the calculations of the function, and displays the view of the object on the display;

whereby the object appears to rotate smoothly in horizontal, vertical, and diagonal directions.

10. A computer program product to perform the method as recited in claim 1 comprises a computer program tangibly embodied in a non-transitory storage device.

11. The computing system as recited in claim 6 wherein said first region having a geometric shape selected from the group consisting of square, octagon, polygon, and circle.

12. The computing system as recited in claim 9 wherein said first region having a geometric shape selected from the group consisting of square, octagon, polygon, and circle.

* * * * *